United States Patent
Fujitani et al.

(10) Patent No.: US 7,170,618 B2
(45) Date of Patent: Jan. 30, 2007

(54) REMOTE PRINTING SYSTEMS AND METHODS FOR PORTABLE DIGITAL DEVICES

(75) Inventors: Satoshi Fujitani, Tokyo (JP); Masao Hashimoto, Tokyo (JP); Takashi Shinohara, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 1275 days.

(21) Appl. No.: 09/791,230

(22) Filed: Feb. 22, 2001

(65) Prior Publication Data

US 2001/0034747 A1 Oct. 25, 2001

(30) Foreign Application Priority Data

Mar. 14, 2000 (JP) ............................. 2000-071358
Mar. 14, 2000 (JP) ............................. 2000-071359
Mar. 14, 2000 (JP) ............................. 2000-071362

(51) Int. Cl.
*G06F 3/12* (2006.01)
*G06K 15/00* (2006.01)

(52) U.S. Cl. .................................. 358/1.15; 358/1.13

(58) Field of Classification Search ............... 358/1.15, 358/1.14, 1.12, 1.13, 1.16, 1.1, 404, 407, 358/296, 300; 705/14, 26, 1; 707/500, 501, 707/513; 345/740, 736, 733, 771
See application file for complete search history.

(56) References Cited

U.S. PATENT DOCUMENTS

| | | | |
|---|---|---|---|
| 4,578,689 A * | 3/1986 | Spencer et al. ............. 347/129 |
| 5,621,640 A * | 4/1997 | Burke ......................... 705/14 |
| 5,991,749 A * | 11/1999 | Morrill, Jr. .................. 705/44 |
| 6,452,689 B1 * | 9/2002 | Srinivasan ................. 358/1.15 |
| 6,573,910 B1 * | 6/2003 | Duke et al. ................. 345/740 |
| 6,601,040 B1 * | 7/2003 | Kolls .......................... 705/14 |
| 6,704,774 B2 * | 3/2004 | Terranova ................... 709/219 |

FOREIGN PATENT DOCUMENTS

| | | |
|---|---|---|
| EP | 0893760 | 1/1999 |
| EP | 0961451 | 12/1999 |
| JP | 10-191453 | 7/1998 |

OTHER PUBLICATIONS

Don Wright, Carl-Uno Manros, and Steve Zilles; Nov. 23, 1999; Internet Printing Protocol Introduction; http://www.pwg.org/ipp/.

* cited by examiner

*Primary Examiner*—Douglas Q. Tran
(74) *Attorney, Agent, or Firm*—Knoble Yoshida & Dunleavy, LLC

(57) ABSTRACT

To facilitate the use of portable digital devices such as cell phones, printer processing stations are proposed for printing the information that is accessible through the portable digital devices. In general, the portable digital devices have easy access to an enormous amount of information but are equipped with a relatively small display screen without an on-board printing capability. To solve the above dilemma, readily available printer stations allow the user to print a selectable portion of the information at one of the predetermined locations and conveniently charge the user for a print fee.

29 Claims, 17 Drawing Sheets

FIG. 7

SELECT PAYMENT METHOD

- ○ CREDIT CARD
- ⦿ PAY AT CASHIER
- ○ DEPOSIT CASH
- ○ CHARGE TO ACCOUNT
- ○ USE PREPAID CARD
- ○ MOBILE PHONE ACCOUNT

FIG. 11

USER PROFILE

| | |
|---|---|
| MAX TIME PER SESSION | ☐ |
| MAX NO. OF PAGES PER SESSION | ☐ |
| MAX NO. OF COPIES | ☐ |
| TIME OF DAY   FROM ☐ | TO ☐ |

FIG. 12

PRINTER PROCESSING USER PROFILE

| | | |
|---|---|---|
| MAX TIME PER SESSION | ☐ | MIN |
| MAX NO. OF PAGES PER SESSION | ☐ | |
| MAX NO. OF COPIES | ☐ | |

TITLE: PORTABLE DEVICE MEMORY DATA FOR Ms. JONES

1. TERMINAL DEVICE No: 070-1234-5678

2. MEMORY DIAL LIST
(1) 01 → 090-9876-5432
(2) 02 → 03-5280-2572

3. REDIAL NUMBER LIST
(1) 0424-81-2211
(2) 03-6543-1234

4. BOOKMARK LIST
(1) http://www.print.com
(2) http://www.nakada.com
(1) http://www.akpat.com 5. E-MAIL ADDRESS LIST
(1) yendo@mail.nejp
(2) ytoyoda@mail.cojp

6. FUNCTION LIST
 01→ MEMORY DIAL
 02→ CALL BACK

REMOTE PRINTING SYSTEMS AND METHODS FOR PORTABLE DIGITAL DEVICES

FIELD OF THE INVENTION

The current invention is generally related to systems and methods of printing information from portable digital devices, and more particularly related to systems and methods of printing information at conveniently located printer stations from digital devices.

BACKGROUND OF THE INVENTION

The use of portable digital devices has already widespread and appears to gain further popularity in the future. The portable digital devices include portable computers, cellular phones, personal handyphone systems (PHS), and personal digital assistances (PDA) such as a Palm™. The portable digital devices are used to keep information such as schedules, addresses, phone numbers as well as to communicate through voice and data. With the recent explosion of the Internet, the portable digital devices are capable of accessing e-mail as well as web sites. For example, in Japan, Nippon Telephone and Telegram (NTT) offers the i-mode™ which allows the portable digital devices such as cell phones to access the web sites for information, on-line shopping, ticket reservations as well as fund transfers.

Despite the above described convenient services, the portable digital devices generally suffer some shortcomings. One of them is a lack of printing capabilities. In fact, the portable digital devices fail to support any print driver and are not equipped with a printer connector. The lack of a print capability is further complicated by a large amount of information to be displayed at certain web sites and a small display on the portable digital devices. The small display cannot show a large amount of information at a time, and a user is not able to understand the information in an efficient manner. The small displays also cannot show graphical information at a reasonably high resolution. For example, a user cannot read a detailed map on a small display on the portable digital device. Furthermore, the portable digital device does not allow the user to open a certain attached file in e-mail. Because of these reasons, it appears necessary to print accessed information so that the user fully and efficiently utilizes the accessed information.

Instead of carrying a printer to print the information accessed through a portable digital device, it is desirable to print the information using one of a plurality of printer stations placed at predetermined or remote locations. In other words, as public phones are widely available for use for a fee, it is desired that public printers should be also widely available.

SUMMARY OF THE INVENTION

In order to solve the above and other problems, according to a first aspect of the current invention, a method of printing information from a portable digital device, including providing printer processing units at predetermined locations; selecting one of the printer processing units for a portable digital device of a user; establishing a connection between the portable digital device and the selected one of the printer processing units; selecting printable information stored at an Internet site while viewing the Internet site at a first resolution level; obtaining the printable information via the portable digital device from the Internet site; printing the printable information at the selected one of the printer processing units at a second resolution level; and charging a fee for the printing to the user.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 7 illustrates one exemplary list of payment methods supported by the printer processing unit according to the current invention.

FIG. 11 is a diagram illustrating exemplary contents of a user profile that is used in the preferred remote print-and-charge process according to the current invention.

FIG. 12 is a diagram illustrating exemplary contents of a printer station profile that is used in the preferred remote print-and-charge process according to the current invention.

DETAILED DESCRIPTION OF THE PREFERRED EMBODIMENT(S)

Figure 1:
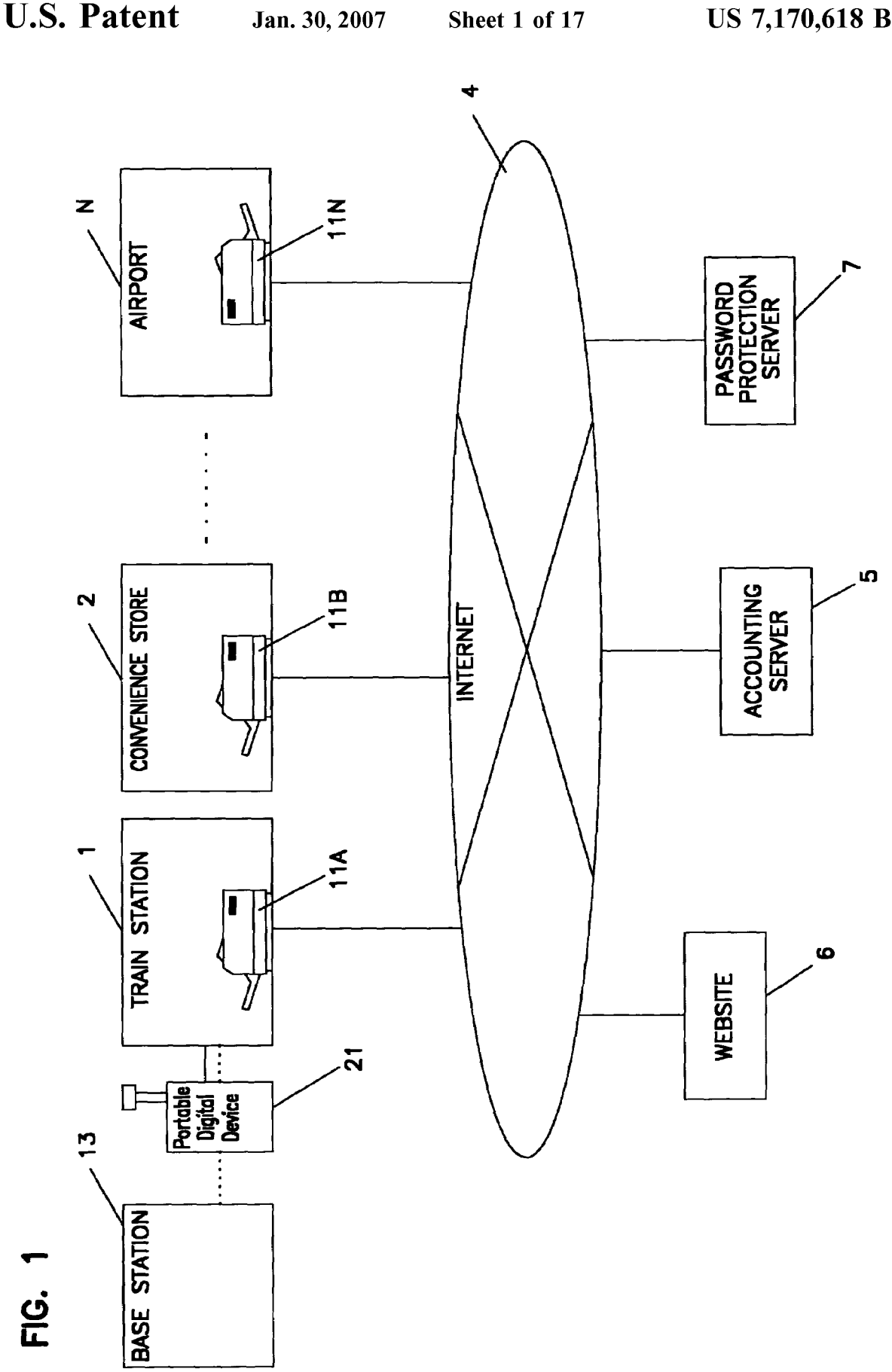
FIG. 1 is a diagram illustrating a concept of the printer system according to the current invention.

Referring now to the drawings, wherein like reference numerals designate corresponding structures throughout the views, and referring in particular to FIG. 1, a diagram illustrates a concept of the printer system according to the current invention. A plurality of printer stations or printer processing units 11A through 11N is placed at various predetermined locations or point of sales (POS) 1 through N such as a train station, a convenient store, a gas station and an airport for easy access. Each of the printer processing units 11A through 11N is a self-contained unit that can be customized depending upon a predetermined set of specifications. It is also possible to retrofit existing coin-operated digital photocopier machines into one preferred embodiment of the printer processing units 11A through 11N according to the current invention by adding a certain set of components such as a communication unit, a charge unit and a processing unit. However, in general, each of the printer processing units 11A through 11N is equipped to interface with a predetermined set of portable digital devices such as a hand-held communication device including a cell phone 21 as well as to communicate through the Internet 4. The interface or connection between the hand-held communication device 21 and the print station 11A includes a cable connection as indicated by a solid line or a wireless connection as indicated by a dotted line. If the cellular phone 21 subscribes to an Internet service, it communicates to its base station 13 in order to access the Internet.

Through the Internet, the printer processing units 11A through 11N access a desired web site 6, a predetermined accounting server 5 as well as a password protection server 7. A desired web site 6 is specified via a user interface of the printer processing units 11A through 11N and is accessed to gain information for printing. One of the purposes of the accounting server 5 is to keep track of necessary information for accounting profit between the operator of the printer processing units 11A through 11N and the store owners where the printer processing units 11A through 11N are placed. The accounting server 5 also keeps track of general statistical information on the use of the printer processing units 11A through 11N for service or maintenance. These above described information is periodically transmitted to the accounting server 5 from the printer processing units 11A through 11N. Alternatively, the accounting server 5 receives the information from the printer processing units 11A through 11N on demand.

Figure 2:
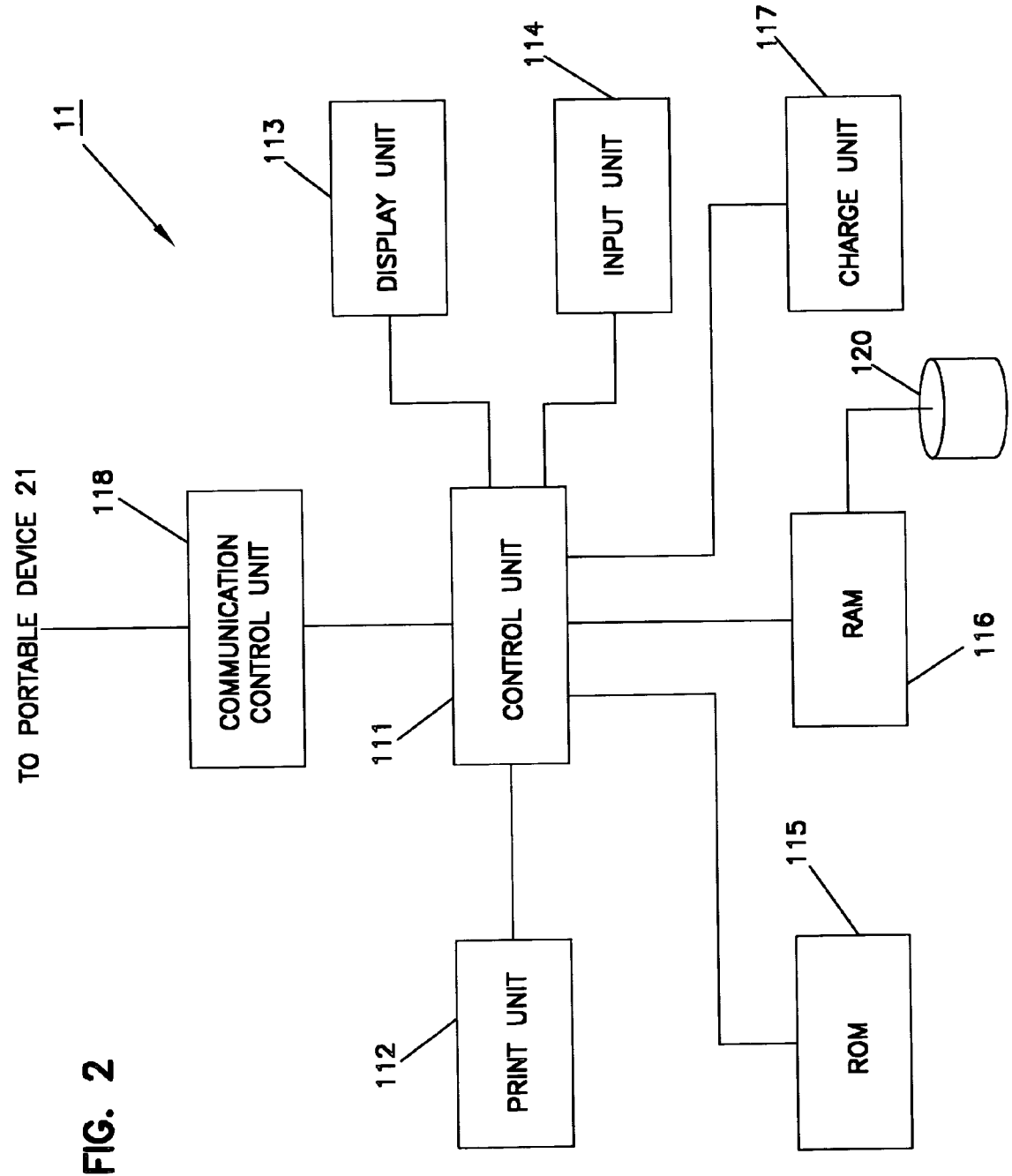
FIG. 2 is a diagram illustrating one preferred embodiment of the printer processing unit or the print station according to the current invention.

Now referring to FIG. 2, a diagram illustrates one preferred embodiment of the printer processing unit or the print station 11 according to the current invention. The preferred embodiment includes a communication control unit 118 for interfacing with a portable digital device such as the cellular phone 21; a control unit, a central processing unit (CPU) or a digital signal processor (DSP) 111 for controlling various functions or units of the printer processing unit 11; a read only memory (ROM) 115, a random access memory (RAM) 116 and a disk storage 120 for storing information such as data and programs to perform the various functions; a display unit 113 for interfacing with a user and an input unit 114 for interfacing with a user of the printer processing unit 11; a print unit such as a color laser printer or a color ink jet printer 112 for printing a selected or specified information by the user; and a charge unit 117 for charging a fee for printing the selected information. The communication control unit 118 interfaces the input and the output ports for serially transferring data.

Still referring to FIG. 2, in general, the user temporarily connects his or her a portable digital device to the above described preferred embodiment of the printer processing unit 11 according to the current invention for printing a desired set of information that is already stored in the portable digital device 21 or that is to be obtained through the portable digital device 21. After the user selects the desired set of the information to be printed through the display unit 113 such as via graphic user interface (GUI) and the input unit 114 such as a touch-screen, the control unit 111 prepares the selected information for printing and sends the selected information to the print unit 112 through the use of the ROM 115 and the RAM 116. In printing the user selected information, the control unit 111 accesses the data stored in the disk 120, and the data includes user profile information as well as printer profile information for limiting certain print activities such as a maximal number of copies that a particular user and or a particular printer processing unit is allowed to make per print session over a predetermined time period. The profile data will be further explained below. After the specified printing is complete, the charge unit 117 charges the user a fee for printing the selected information through a predetermined payment method. However, the charge unit 117 of the preferred embodiment indicates the fee and a predetermined set of payment methods to the user on the display unit 113 before printing, and the user selects the preferred method of payment via the input unit 114.

Figure 3:
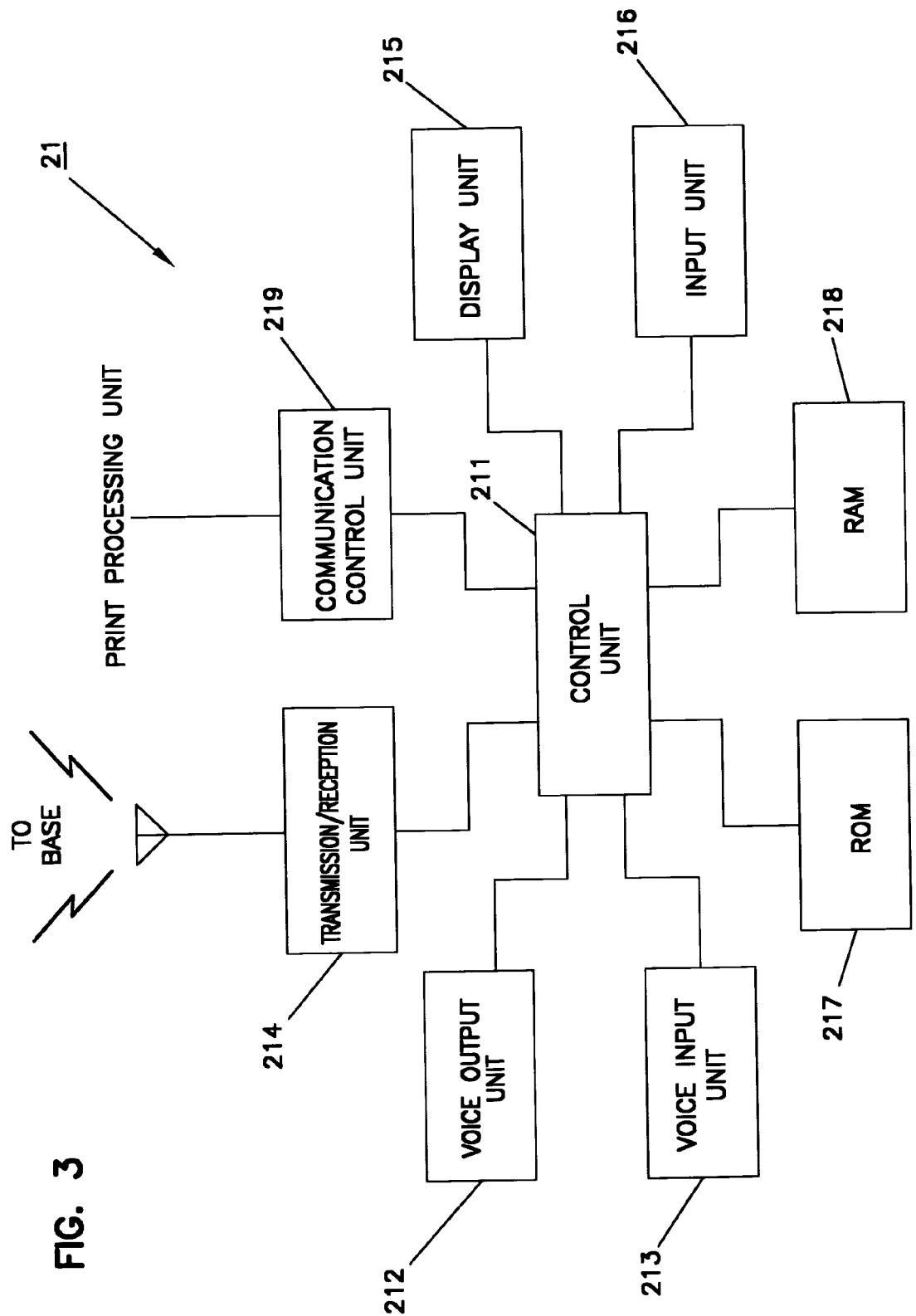
FIG. 3 is a diagram illustrating one preferred embodiment of the portable digital device according to the current invention.

Now referring to FIG. 3, a diagram illustrates one preferred embodiment of the portable digital device 21 according to the current invention. The preferred embodiment includes a communication control unit 219 for interfacing with a printer processing unit 11; a control unit or a central processing unit 211 for controlling various functions or units of the portable digital device 21; a read only memory (ROM) 217 and a random access memory (RAM) 218 for storing information such as data and programs to perform the various functions; a display unit 215 and an input unit 216 for interfacing with a user of the portable digital device 21; a voice input unit 213 such as a microphone and a voice output unit 212 such as a speaker for inputting and outputting voice signals; and a transmission/reception unit 214 for receiving and transmitting information to and from the portable digital device 21. Although the ROM 217 contains certain software programs for providing various functions and coordinating various units of the portable digital device 21, no printer driver is contained in the portable digital device 21. The RAM 218 has an independent and alternative battery power supply and stores certain information such as addresses, telephone numbers, book marked universal resouce locators (URLs) or web addresses and a memory calling list.

Still referring to FIG. 3, in general, the user temporarily connects the above described portable digital device 21 to the printer processing unit 11 according to the current invention for printing a desired set of information that is already stored in the portable digital device 21 or that is to be obtained through the portable digital device 21. The temporary connection is either via a cable or wireless communication such as an infrared. After the user selects the desired set of the information to be printed through the display unit 215 and the input unit 216, the control unit 211 prepares the selected information for printing and sends the selected information to the printer processing unit 11 through the use of the RAM 116. In accessing the user selected information, the control unit 211 accesses the desired data through the transmission/reception unit 214.

Figure 4:
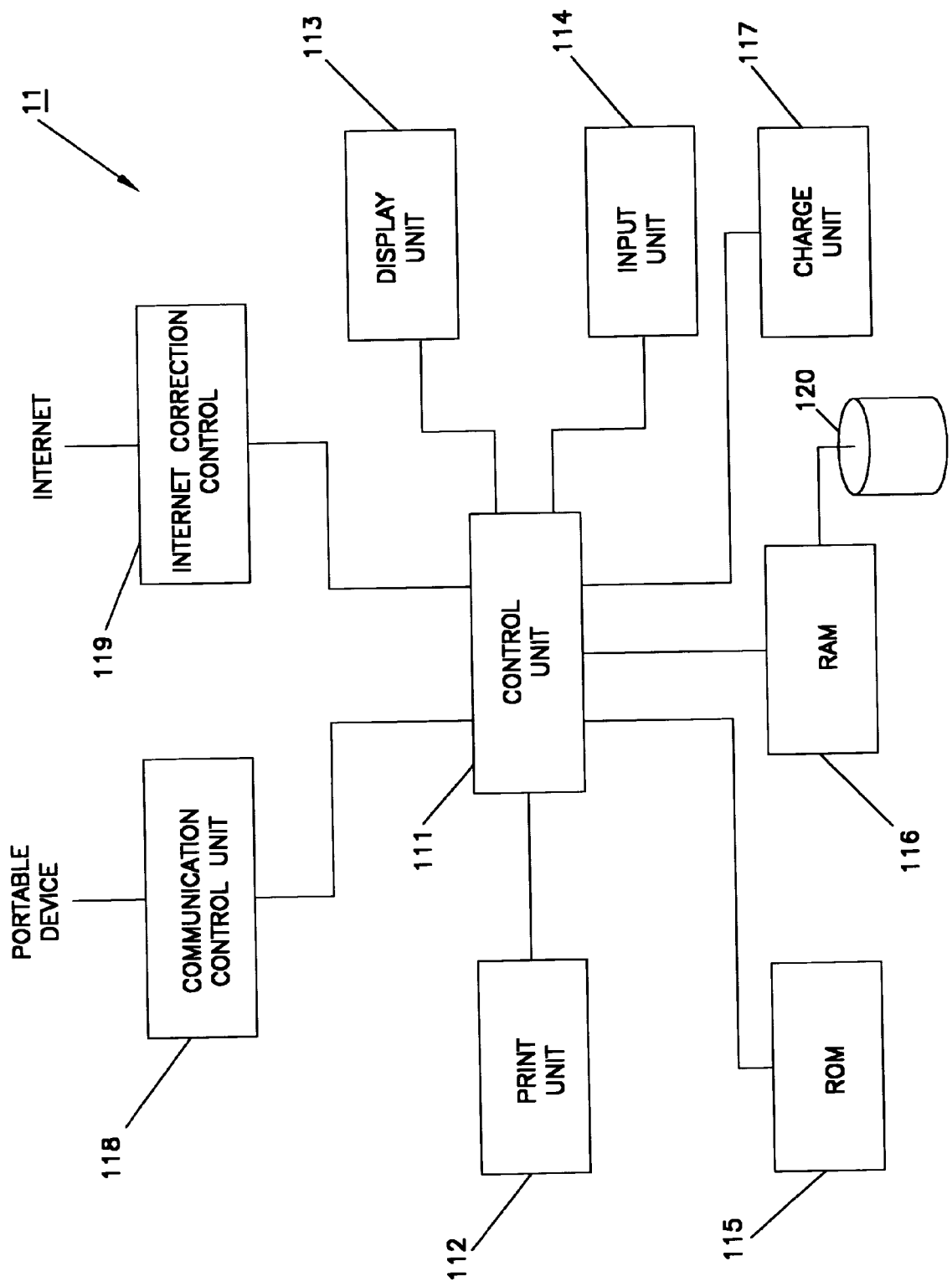
FIG. 4 is a diagram illustrating a second preferred embodiment of the printer processing unit according to the current invention.

Referring to FIG. 4, a diagram illustrates a second preferred embodiment of the printer processing unit 31 according to the current invention. The second preferred embodiment includes a communication control unit 118 for interfacing with a portable digital device such as the cellular phone 21; a control unit or a central processing unit 111 for controlling various functions or units of the printer processing unit 11; a read only memory (ROM) 115, a random access memory (RAM) 116 and a disk storage device 120 for storing information such as data and programs to perform the various functions; a display unit 113 and an input unit 114 for interfacing with a user of the printer processing unit 11; a print unit 112 for printing a selected or specified information by the user; and a charge unit 117 for charging a fee for printing the selected information. The second preferred embodiment additionally includes an Internet connection control unit 119 for controlling the direct Internet connections between the print processing unit 31 and a desired web server.

Still referring to FIG. 4, in general, the user temporarily connects his or her a portable digital device to the above described second preferred embodiment of the printer processing unit 31 according to the current invention for printing a desired set of information that is already stored in the portable digital device 21 or that is to be obtained through the portable digital device 21. Alternatively, in the second preferred embodiment, the printer processing unit 31 directly obtains desired information from a web site that the user specifies through the input unit 114. After the user selects the desired set of the information to be printed through the display unit 113 and the input unit 114, the control unit 111 prepares the selected information for printing in the RAM based upon a predetermined format and sends the selected information to the print unit 112 through the use of the ROM 115 and the RAM 116. In printing the user selected information, the control unit 111 accesses the data stored in the disk 120, and the data includes user profile information as well as printer profile information for limiting certain print activities such as a maximal number of copies that a particular user and or a particular printer processing unit is allowed to make per print session. The profile data will be further explained below. After the specified printing is complete, the charge unit 117 charges the user a fee for printing the selected information through a predetermined payment method. However, the charge unit 117 of the preferred embodiment indicates the fee and a predetermined set of payment methods to the user on the display unit 113 before printing, and the user selects the preferred method of payment via the input unit 114.

For example, the charge unit accepts a prepaid card. Prior to printing, the charge unit 117 determines a printing fee or charge for the current print job. Then, the charge unit 117 reads a prepaid card and determines whether or not there is a sufficient amount of unused fund available on the prepaid card for the above determined print charge. The unused fund may be represented in a predetermined unit. If the charge for each page is 2 units and three pages are to be printed, the total print charge is 6 units. Assuming that the prepaid card holds 10 units, the charge unit 117 sends a signal indicative of proceeding the above printing to the print unit 112 and records the remaining 4 units on the prepaid card before dispensing it to the user. Finally, information on the above print job such as a number of print outs and print time is kept for the record in the RAM 116 or the disk 120.

Figure 5:
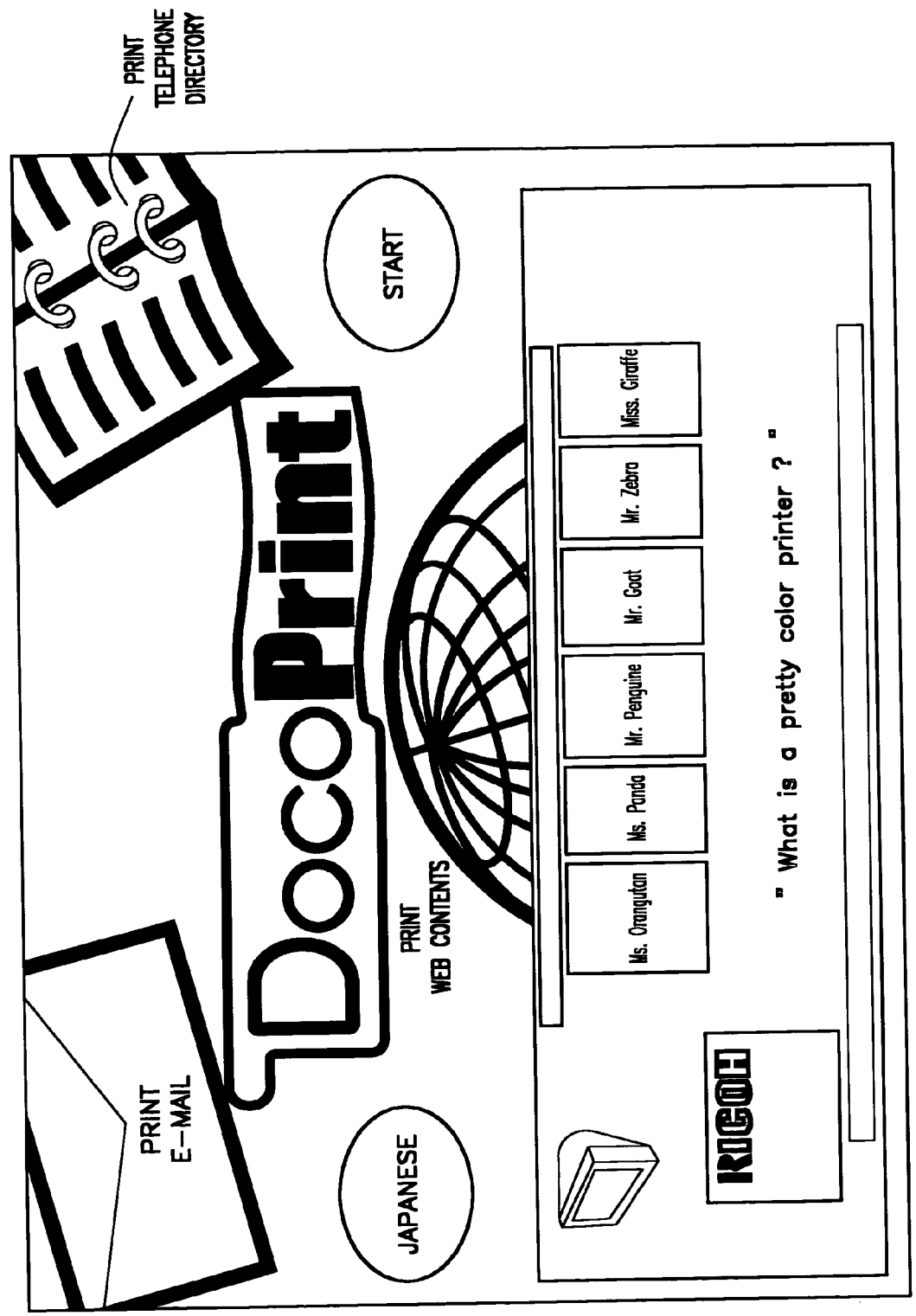
FIG. 5 is a diagram illustrating one stage of one preferred embodiment of the user interface screen on the display unit in the printer processing unit according to the current invention.

Referring to FIG. 5, a diagram illustrates one stage of one preferred embodiment of the user interface screen on the display unit 113 in the printer processing unit 11 or 31 according to the current invention. The preferred user interface includes information on what can be printed using the printer station in the upper half and some advertisement in the lower half. The lower portion of the print station display unit 113 shows any predetermined advertisement while the print stations 11 and 31 are waiting for use. The user is able to touch a certain area of the advertisement to receive additional information. The advertisement is optionally shown to the user also throughout the use of the print stations 11 and 31. The upper portion shows that a user has a choice of printing e-mail, web site contents or data base contents such as a telephone directory. In addition, the user is provided with a choice of the display in a foreign language such as Japanese. In order to initiate printing, the user touches a screen surface area corresponding to a desired language and "start."

Figure 6:
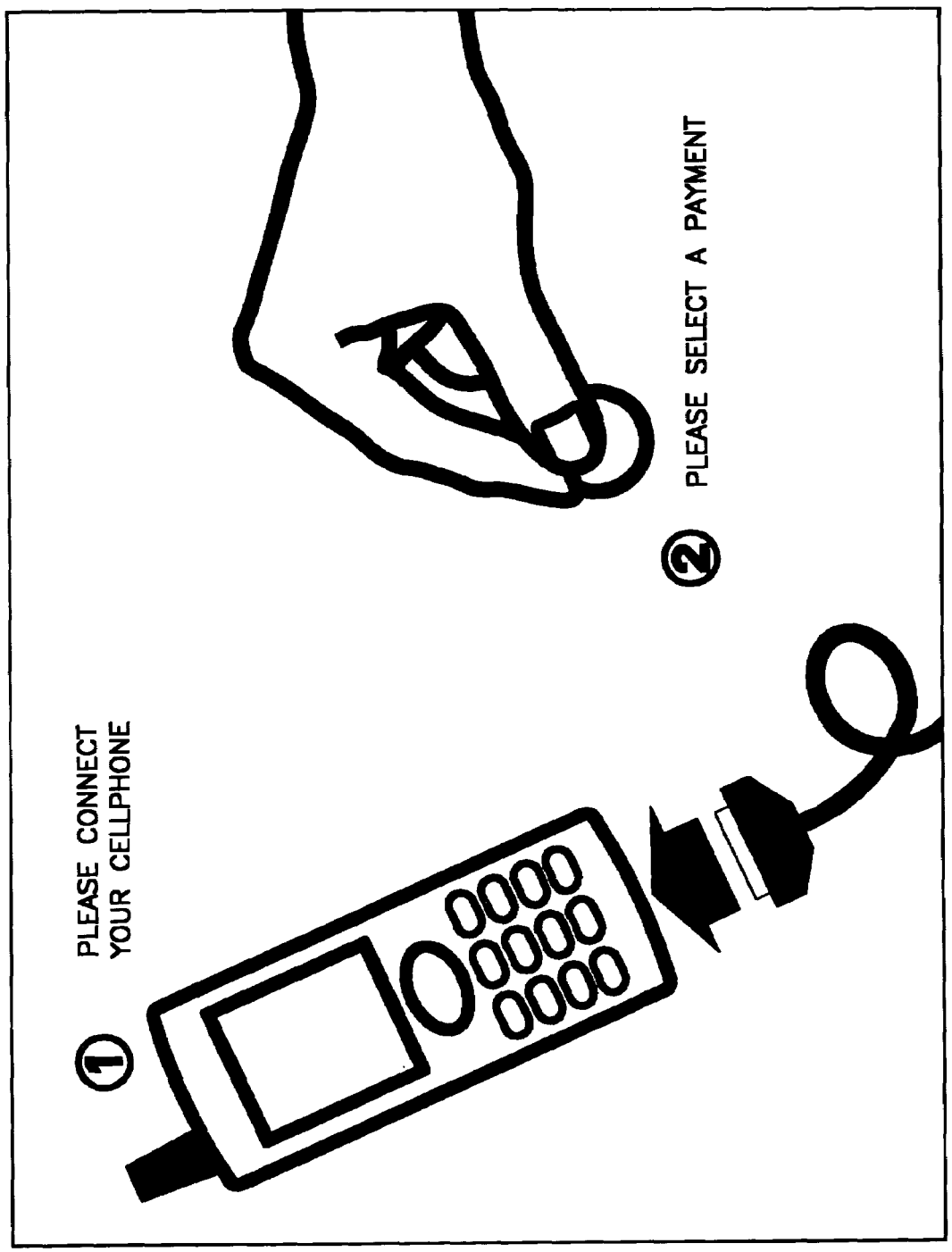
FIG. 6 is a diagram illustrating another stage of the preferred embodiment of the user interface screen on the display unit in the printer processing unit according to the current invention.

Referring now to FIG. 6, a diagram illustrates another stage of the preferred embodiment of the user interface screen on the display unit 113 in the printer processing unit 11 or 31 according to the current invention. This stage of the user interface indicates that the user is supposed to establish a connection between a portable digital device and the printer processing unit. The temporary connection is made via a connection cable or an infrared wireless connection. After the connection is established, the user is asked to select a preferred payment method. One example of a payment method is cash. The charge unit 117 determines an amount of a print charge and indicates the amount on the display unit 113. The charge unit 117 further includes a cash accepting unit and monitors an amount of deposit in the cash accepting unit. The display unit 113 provides necessary messages including the print charge amount, the deposited amount, the remaining amount after print and a change amount. Although the illustration shows a deposit of a coin, the preferred user interface additionally provides other payment options.

One example of such a list of payment methods is shown in FIG. 7. The user is asked to select one of the predetermined methods that include a charge to a credit card, a cash payment at a check out line or a casher at the point of sales where the print stations are located, a cash payment into a cash accepting machine, a charge to a predetermined account for printing, use of a prepaid card and a charge to a mobile telephone billing account. If a credit card or a prepaid card is selected, the user is asked to swipe the card on a card reader of the charge unit 117 at this stage. Furthermore, the charge unit 117 further includes a card writer to record a remaining amount on the prepaid card after charging. Similarly, if a predetermined account such as a print or mobile telephone account is selected, the user has to input a corresponding account number and a certain predetermined validation code. Alternatively, a key card contains the identification information for the charge account in lieu of inputting the information. For the use of the mobile telephone account, the phone number is read into the RAM 116 from the portable digital device 21 that is connected to the print station 11, 31. The print charge along with the phone number is later transmitted to the corresponding carrier telephone company so that the cell phone user is ultimately charged for the printing. The telephone company retains a predetermined portion of the print charge for handling and transfers the rest to the operator of the print station. Lastly, if a cash payment method is selected, at this stage of the preferred user interface, no user identification may be required.

Figure 8:
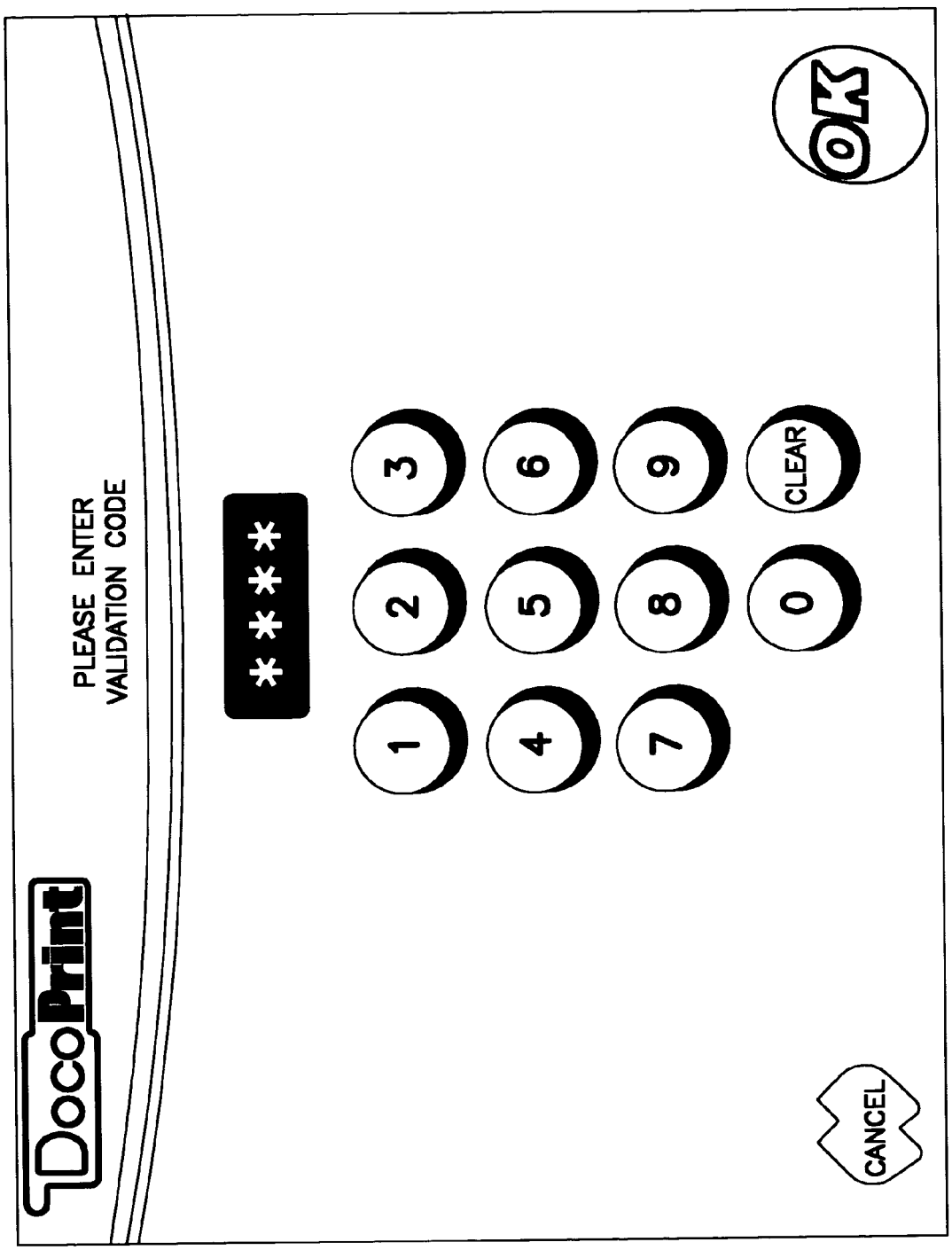
FIG. 8 is a diagram illustrating one exemplary user interface for identifying a user before printing information according to the current invention.

Referring to FIG. 8, a diagram illustrates one exemplary user interface for identifying a user before printing information according to the current invention. Depending upon the selected payment method, it is necessary to identify the user via a validation code or personal identification number (PIN). If a predetermined print charge account is selected for payment, in one implementation, information on the user identification and or the corresponding account number is stored in a portable digital device that has been temporarily connected to the print station and the information is automatically retrieved from the portable digital device. Then, the user is simply asked to input a PIN code via the touch-screen user interface. In another implementation, the user has to input both a user identification number and or an account number followed by a PIN to validate a proper use prior to printing. Although the exemplary user interface shows only numerical input buttons, other input buttons such as alphanumeric keys are also within the scope of the current disclosures. Another use for identifying a user is to access certain information applicable to the user. The information is used to limit the user in performing certain aspects of printing. In addition, the user identification is optionally used to restrict a number of users or to confirm a pre-approved membership for using the print stations.

Figure 9:
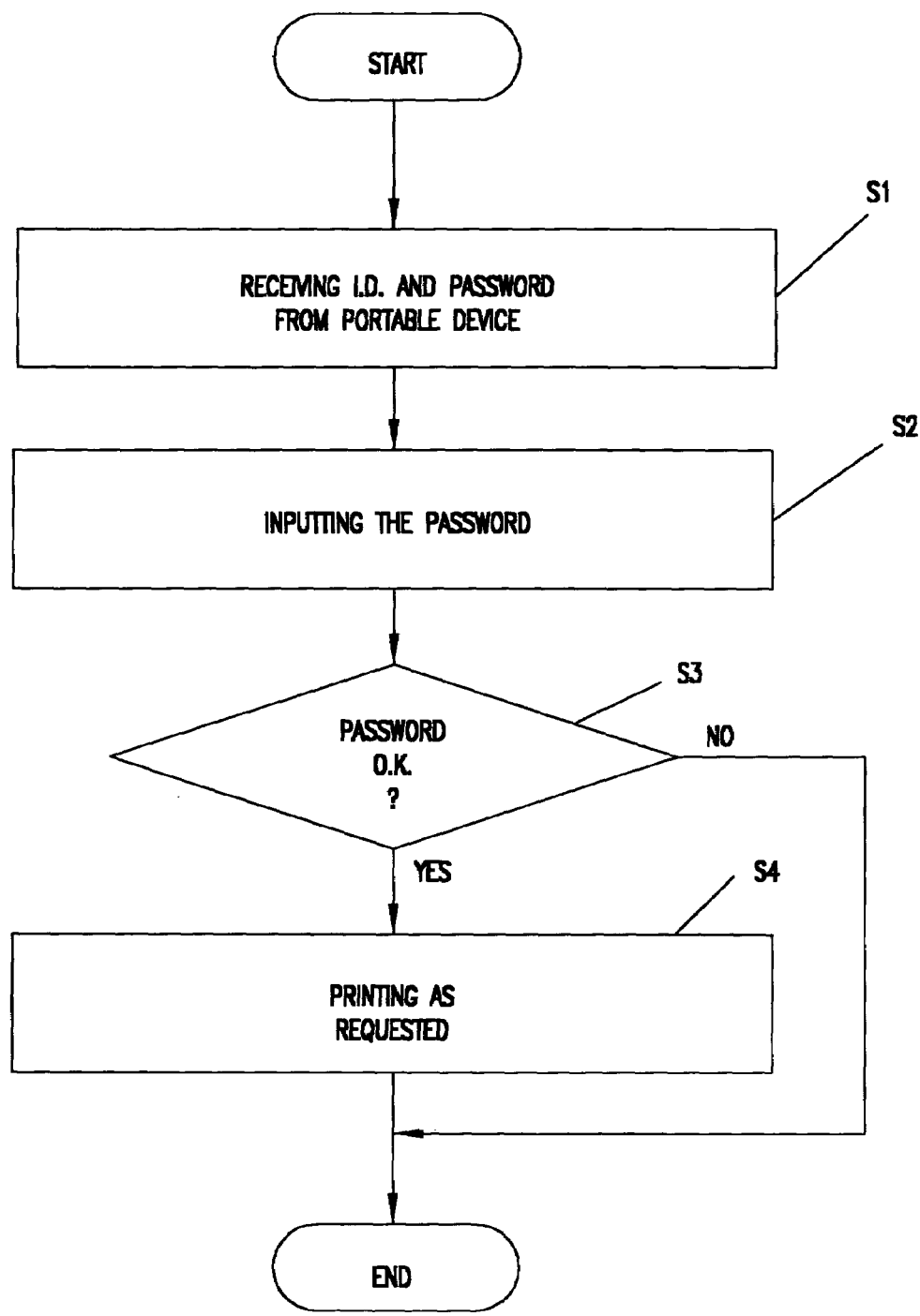
FIG. 9 is a flow chart illustrating acts involved in one preferred process of identifying a user according to one aspect of the current invention.

Referring to FIG. 9, a flow chart illustrates acts involved in one preferred process of identifying a user according to one aspect of the current invention. In act S1, assuming that the portable digital device 21 as shown in FIG. 3 has been temporarily connected to the print station 11 or 31 as respectively shown in FIGS. 1 and 4, the print station 11 or 31 retrieves information stored in the portable digital device 21 in act S1. The information includes at least user identification (ID) and a PIN code or a password for the user ID. After receiving the above information, the print stations 11 and 31 prompt a user to input a PIN code or a password and waits for the input in act S2. Upon receiving the password input, the print station 11 or 31 compares the inputted password to the retrieved password in act S3. If the comparison in the act S3 confirms a match, a requested print process proceeds in act S4. On the other hand, the comparison in the act S3 fails to confirm a match, the user identification process ends. Alternatively, the negative match in the act S3 leads to the act S2 to wait for receiving another password. The alternative user identification process repeats the password comparison acts S2 and S3 for a predetermined number of times before ending the process.

Figure 10:
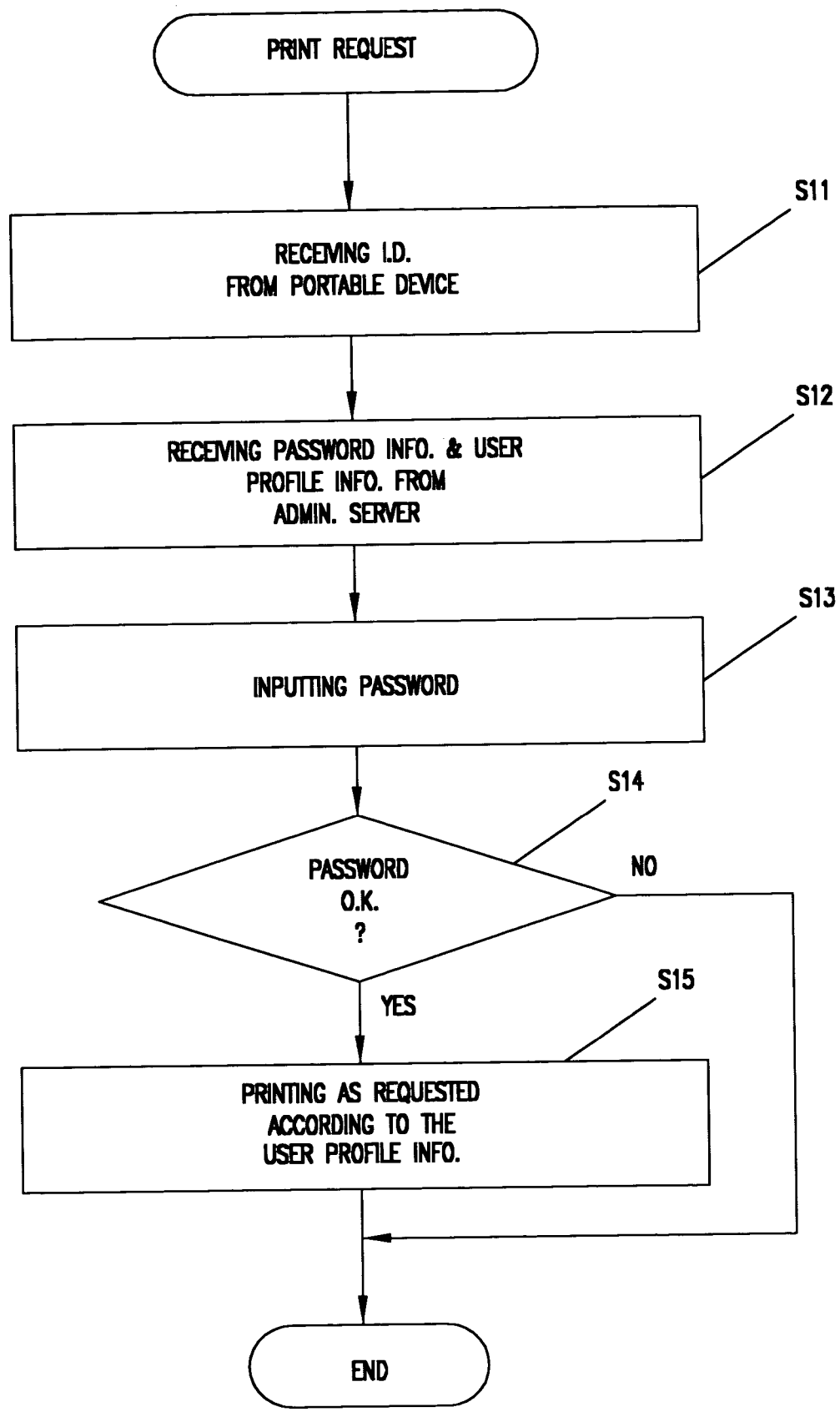
FIG. 10 is a flow chart illustrating acts involved in a second preferred process of identifying a user according the current invention.

Referring to FIG. 10, a flow chart illustrates acts involved in a second preferred process of identifying a user according the current invention. In act S11, assuming that the portable digital device 21 as shown in FIG. 3 has been temporarily connected to the print station 11 or 31 as respectively shown in FIGS. 1 and 4, the print station 11 or 31 retrieves information stored in the portable digital device 21 in act S11. The retrieved information includes at least user identification (ID). In addition, in act S12, the print station 11 or 31 further retrieves a PIN code or a password for the user ID from a predetermined user information server that is connected to the print station 11 or 31. The user information server stores additional information such as user profile information as will be further described below. After receiving the above information, the print stations 11 and 31 prompt a user to input a PIN code or a password and waits for the input in act S13. Upon receiving the password input, the print station 11 or 31 compares the inputted password to the retrieved password in act S14. If the comparison in the act S14 confirms a match, a requested print process proceeds in act S15. On the other hand, the comparison in the act S14 fails to confirm a match, the user identification process ends. Alternatively, the negative match in the act S14 leads to the act S13 to wait for receiving another password. The second alternative user identification process repeats the password comparison acts S13 and S14 for a predetermined number of times before ending the process.

Now referring to FIG. 11, a diagram illustrates exemplary contents of a user profile that is used in the preferred remote print-and-charge process according to the current invention. In general, the user profile is created for a given user and contains certain predetermined information for processing a print request from the particular individual. One exemplary user profile includes information on a maximal number of copies or prints that the particular user is allowed to make per a predetermined time frame such as each print session and or a certain set of functions that he is allowed to use. In addition, the user profile information includes a maximal amount of time allowed for a particular user during one print session as well as a time period such as time of the day or day of the week when a particular user is allowed to use a print station. Furthermore, the user profile optionally includes cyberspace information such as a user's e-mail address and book marks for web sites. The user profile information is stored in a local disk storage unit at the print processing unit 11 or 31 or in a central server that the print processing units 11 and 31 share. Alternatively, the user profile information of a particular individual user is stored in a portable digital device 21.

Referring to FIG. 12, a diagram illustrates exemplary contents of a printer station profile that is used in the preferred remote print-and-charge process according to the current invention. In general, the printer station profile is created for a given printer station and contains certain predetermined information for processing a print request from the particular individual. One exemplary printer station profile includes information on a maximal number of copies or prints that any user is allowed to make per each print session and or a certain set of functions that the printer station offers. In addition, the printer station profile information includes a maximal amount of time allowed for any user during one print session. The printer station profile information is stored in a local disk storage unit at the print processing unit 11 or 31 or in a central server that the print processing units 11 and 31 accesses. When the above described printer station profile is used in combination with the user profile information and there is a conflict between the two sets of information, according to one preferred process, the printer station profile preempts the user profile.

Figure 13:
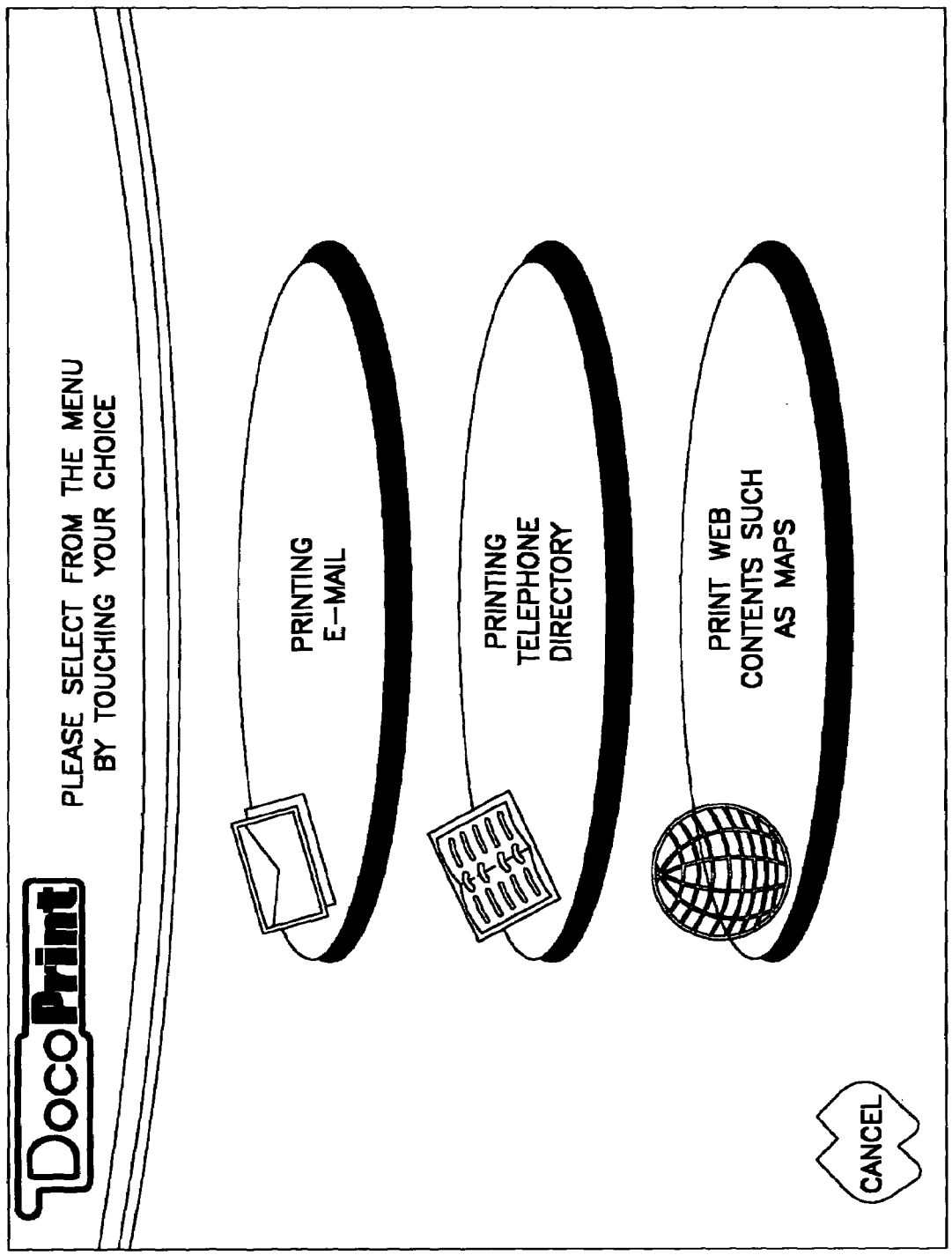
FIG. 13 is a diagram illustrating one exemplary user interface for selecting a desired category of information to be printed according to the current invention.

Referring to FIG. 13, a diagram illustrates one exemplary user interface for selecting a desired category of information to be printed according to the current invention. One example of the touch-screen menu selection offers "e-mail," "telephone directory" or "web-site contents." In general, information is downloaded from the Internet according to a selected choice. When the e-mail option is selected, the e-mail contents are retrieved via the portable digital device 21 or directly by the printer stations 11 or 31 from an e-mail address that is specified in the user profile information according to one implementation. As described above, the user profile contains cyberspace information including an e-mail address. If the user profile includes more than one e-mail address, a user selects one of them from a displayed list. Similarly, a telephone directory is accessed based upon certain information in the user profile. Alternatively, a generic telephone directory is accessed, and the user inputs additional search information for retrieving a certain telephone number. Lastly, the web site content information is also retrieved based upon book marked information in the user profile or an additional input.

Figure 14:
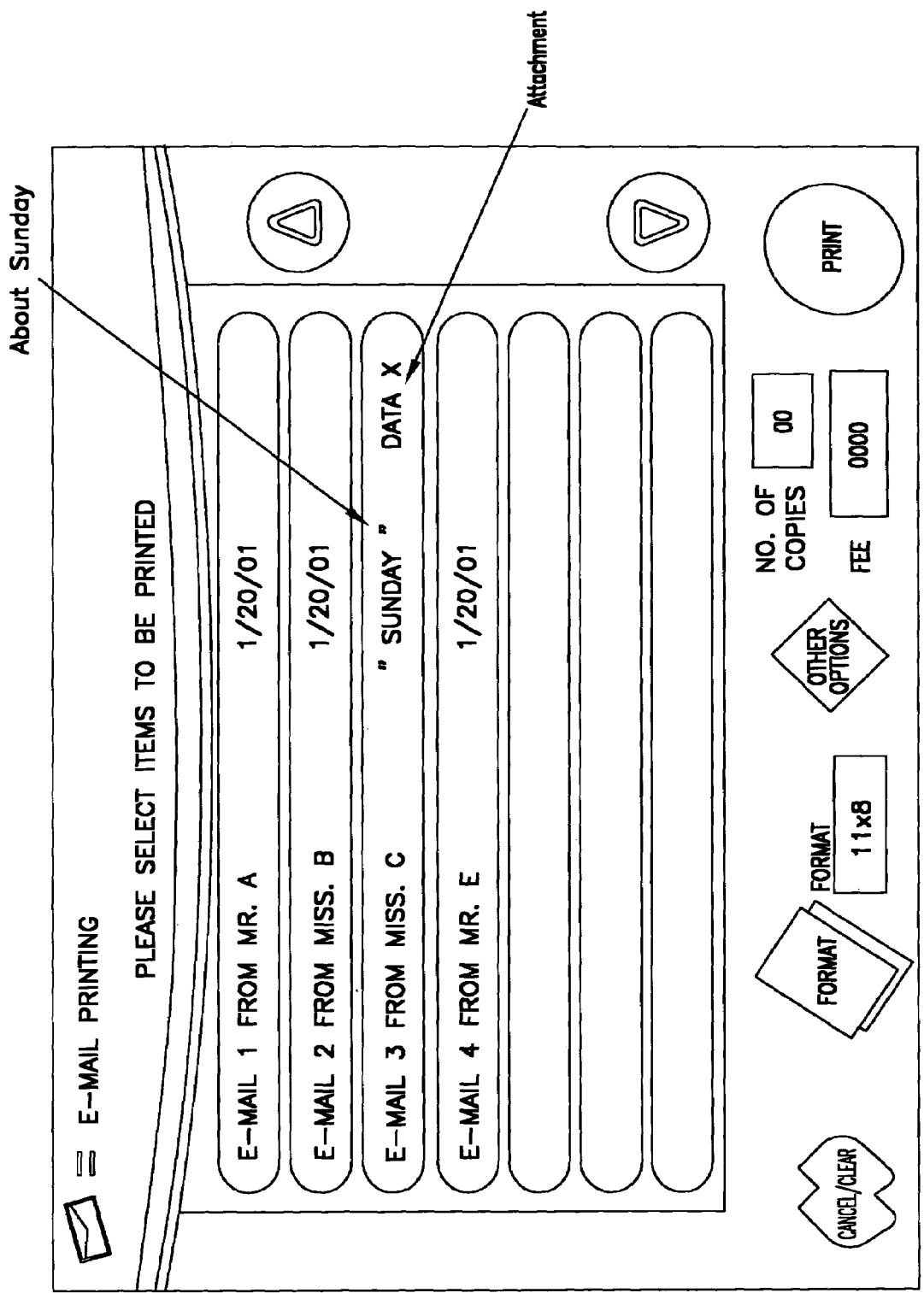
FIG. 14 is a diagram illustrating one exemplary user interface for selecting a desired e-mail to be printed according to the current invention.

Referring to FIG. 14, a diagram illustrates one exemplary user interface for selecting a desired e-mail to be printed according to the current invention. One example of the touch-screen menu selection offers a list of e-mail whose entries are identified by the sender and the date. In addition, the existence of an attachment to e-mail is indicated. To select one or a series of e-mail to be printed, the user simply touches the e-mail item, and the selected item is now highlighted. In this example, "e-mail 3 from Miss C" has been selected. The attachment is optionally and independently selectable. To display a long list of e-mail entries, the user touches up and down triangular buttons for scrolling respectively upwards and downwards. In order to select a plurality of e-mail items, the above described process is repeated. To browse the content of the selected e-mail, the user quickly touches the selected item twice as if double clicking, and the content of the e-mail is displayed for confirmation. Lastly, to cancel or clear the selected items, the user touches a cancel/clear bottom at the lower left corner.

Still referring to FIG. 14, after the e-mail items are selected, the user optionally determines print parameters such as a desired format of a print out as well as a number of copies. The print parameters generally include an output format and a number of copies, and these two parameters are displayed at the bottom of the exemplary user interface. For the print format, a default print format such as 11×8 is displayed. In order to change the print format, the user must touch a format button and an additional user interface will appear to select another print format. To specify a number of copies to be printed, the user first touches the number indicator area to invoke a numeric pad screen and specifies a desired number via the numeric pad screen. Based upon the specified number of print outs and the selected print format, an amount of a fee or cost for printing is indicated in the fee area. At this point, the user can proceed to print by touching the print button or area at the lower right corner of the user interface. In addition to the above described print parameters, the user optionally can specify other print parameters that are not displayed on the user interface. To specify the additional print parameters, the user touches the other options button at the bottom of the user interface.

Figure 15:
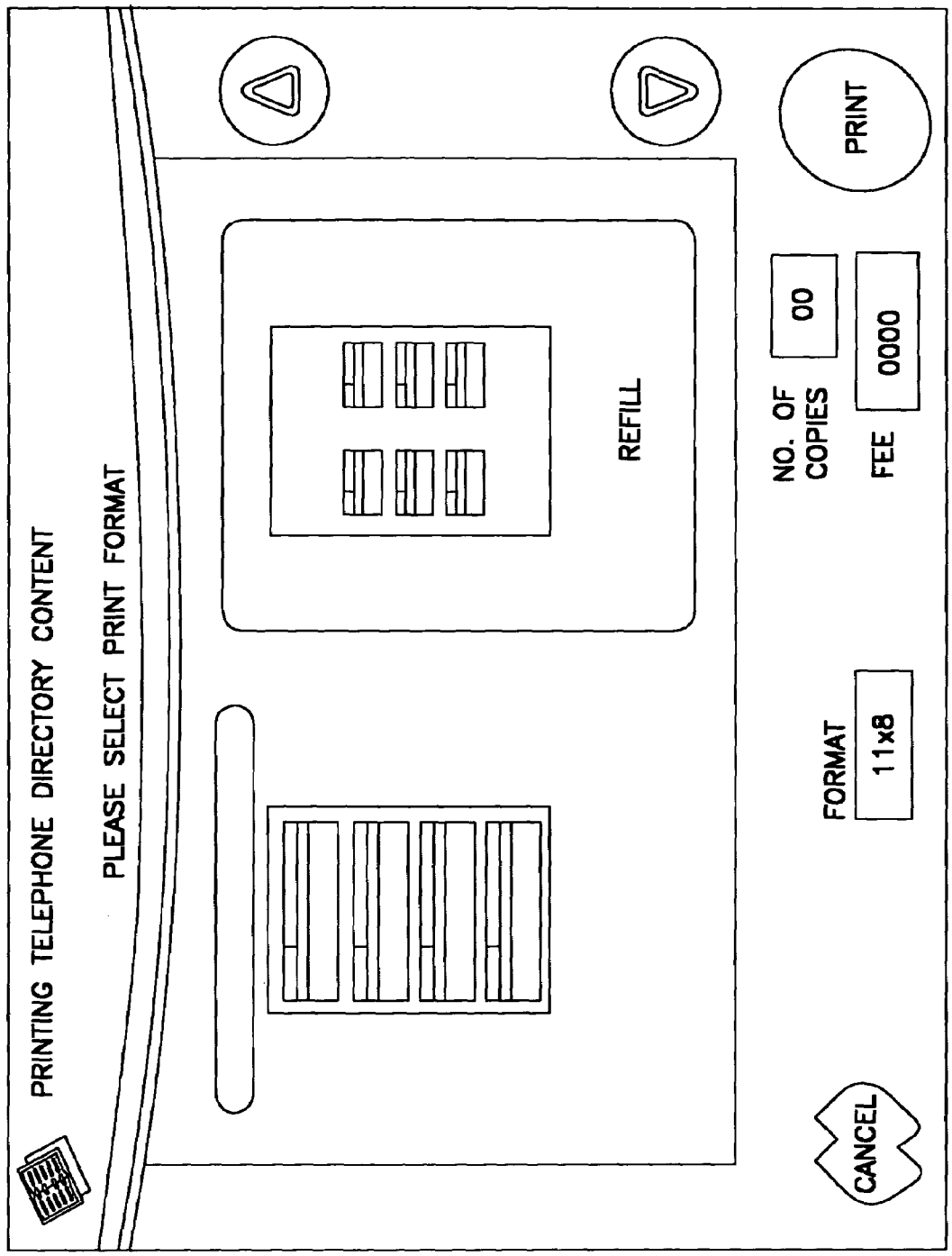
FIG. 15 is a diagram illustrating one exemplary user interface for selecting desired optional print parameters according to the current invention.

Referring to FIG. 15, a diagram illustrates one exemplary user interface for selecting desired optional print parameters according to the current invention. One example of the touch-screen option menus includes a print format. In this example, two print formats are offered for printing telephone directory entries. To select a desired print format, the user touches a screen area corresponding to the desired print format. In addition to a print format, although the exemplary diagram does not show, the size and the direction of paper are optionally selectable. Depending upon the selected print options and parameters, the print fee may be updated to reflect the selections.

Figure 16A:
FIG. 16A is a diagram illustrating a print preview of a graphic image at the predetermined low resolution level.
Figure 16B:
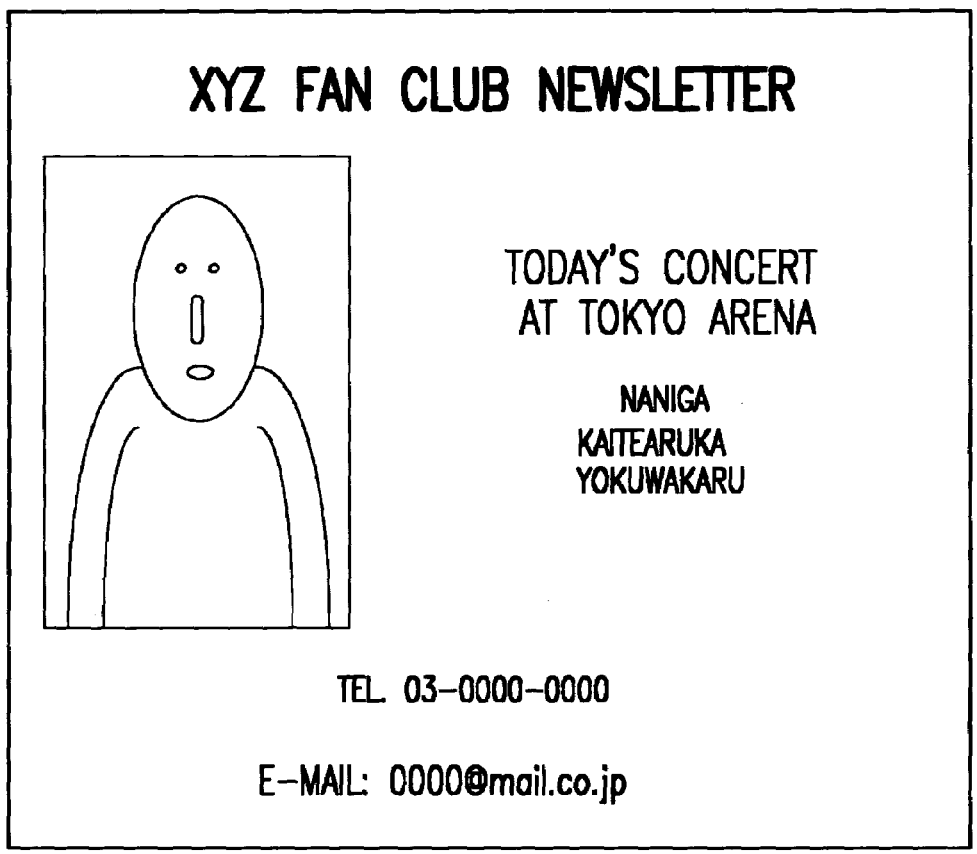
FIG. 16B is a diagram illustrating a print preview of the same image at the predetermined high resolution level.

Referring to FIGS. 16A and 16B, diagrams illustrate print previews of one exemplary image for selecting an additional optional print parameter according to the current invention. One example of the touch-screen option menus includes a resolution level. In this example, two print resolution levels are offered for printing a graphic image. To select a desired resolution level, the user touches a screen area corresponding to the desired resolution level. According to one example, the resolution levels are either high or low. FIG. 16A illustrates a print preview of a graphic image at the predetermined low resolution level. Not only the detailed of a graphic image is lost, but also that of the textual image is lost. FIG. 16B illustrates a print preview of the same image at the predetermined high resolution level. For example, the high resolution is provided at 1200 dots per inch (DPI), 36 gradations and 256 colors. Both graphical and textual details are see in the preview image. The implication of the resolution option is significant in certain application such as printing maps. The resolution option therefore accesses the image of a desired resolution from an address referenced by a particular URL. Depending upon the selected print options and parameters, the print fee may be updated to reflect the selections.

To simplify the implementation of the resolution option, a web site content server stores an image at a predetermined resolution levels at different addresses or URL'S. For example, the URL for a high resolution image is:
 "http://www.domain_name/
 printer.html&high_resolution=http://www.domain-
 _name/printer_p.html&print_charge=$0.75"

The URL indicates the image is store at http://www.domain-_name/printer.html&high_resolution while the charge information for the high resolution is $0.75 per print. Similarly, the URL for a corresponding low resolution image is:
 "http://www.domain_name/
 printer.html&low_resolution=http://www.domain-
 _name/printer_p.html&print_charge=$0.25"

The URL indicates the image is store at http://www.domain-_name/printer.html&low_resolution while the charge information for the low resolution is $0.25 per print. Thus, the URL is read into the RAM to extract certain information in determining a print charge. Furthermore, the URL is designed to include information on a requester, and the content server keeps a list of registered users. Thus, the content server decides whether or not the request is allowed based upon the registration upon each access.

Figure 17:
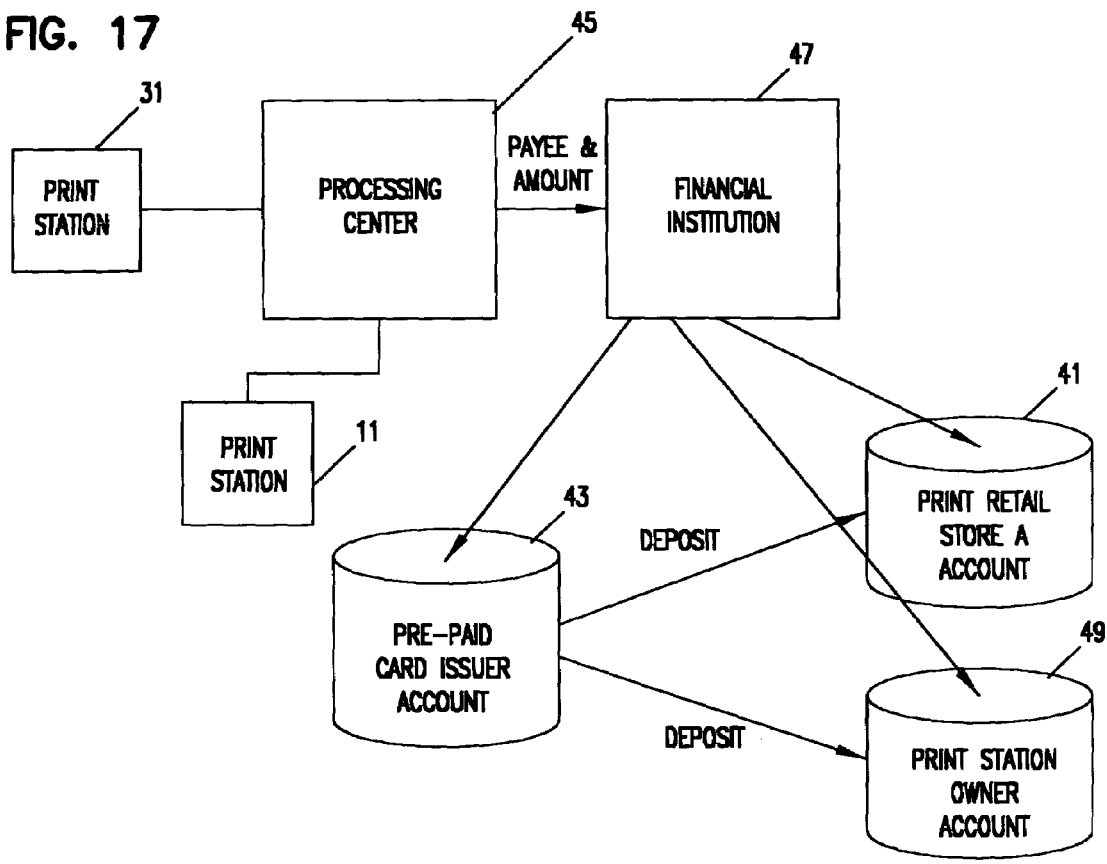
FIG. 17 is a diagram illustrating one preferred embodiment of the accounting or profit distribution sub-system of the print-and-charge system according to the current invention.

FIG. 17 illustrates one preferred embodiment of the accounting or profit distribution sub-system of the print-and-charge system according to the current invention. The print stations 11 and 31 are connected to a predetermined processing center 45 for periodically reporting relevant identification and financial data including a predetermined print station identification number, an total sales amount and so on. Furthermore, the identification information includes a charge account information for each individual or group and the corresponding print charge information. According to one scheme, participants in the profit distribution include a print station owner, a print location operator such as a retail store operator who has the print station on the premises, and a prepaid card issuer/distributor who sells prepaid cards for using the print stations. The processing center 45 processes the reported data and calculates a profit distribution amount for each of the participants based upon a predetermined agreement. The profit distribution amounts are reported to a financial institution 47 such as a bank for electronic deposits or wiring. The financial institution 47 makes the calculated deposits respectively to a prepaid card issuer account 43, a retail store account 41 and a print station owner account 49. Furthermore, if the prepaid card issuer has not paid the retail store owner and the print station owner the predetermined percentage of the prepaid card sales amount, the prepaid card issuer now makes deposits to the retail store owner and the print station owner based upon an agreement.

The above described profit distribution sub-system is only exemplary, and there are numerous variations. For example, the store owners may own or lease the print stations. Another example of the variations is that the prepaid card issuer pays the store owners and the print station owners commissions at a fixed rate before the profit distributions. Furthermore, the print stations 11 and 31 also send charge information to charge accounts that the user specify as a preferred payment. For example, if the user specifies to charge the print fee to a mobile telephone account, the print stations 11 and 31 send the charge information to the processing center 45. In turn, the processing center 45 requests the payment from the corresponding telephone companies, the telephone companies then make payments to the financial institutions 47.

Figure 18:
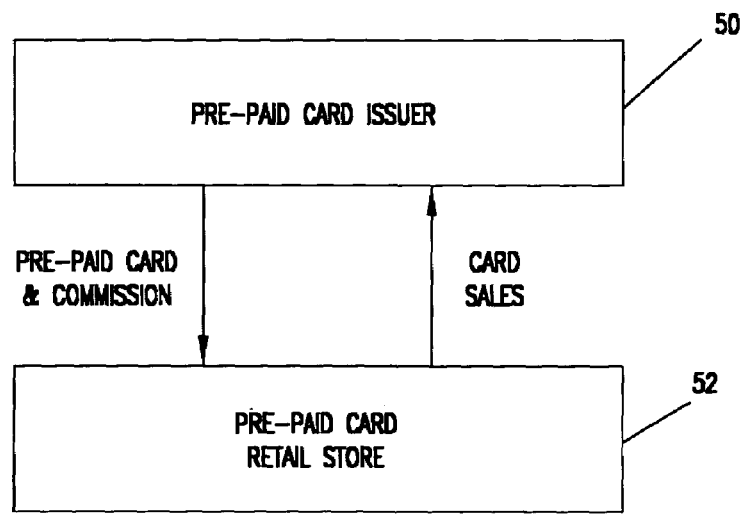
FIG. 18 is a diagram illustrating exemplary transactions between a prepaid card issuer and a prepaid card retail store.

FIG. 18 illustrates an exemplary transactional diagram between a prepaid card issuer 50 and a prepaid card retail store 52. According to this exemplary scheme, the prepaid card issuer 50 manufactures and distributes prepaid cards to the prepaid card retailer 52. Upon delivering the prepaid cards, the prepaid card issuer 50 pays the prepaid card retailer 52 some predetermined commission. After the prepaid cards are sold, the prepaid card retailer 52 pays the corresponding prepaid card sales amount. Needless to say that the retail store where the print station is located can sell the prepaid cards as the prepaid card retailer 52.

Figure 19:
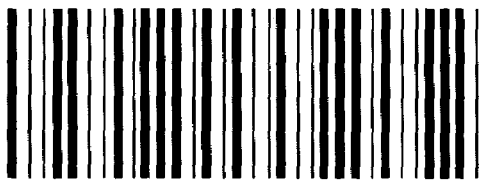
FIG. 19 illustrates an exemplary print out with a bar code indicating an amount of cash payment for a print fee according to the current invention.

FIG. 19 illustrates an exemplary print out with a bar code indicating an amount of cash payment for a print fee according to the current invention. The print out includes information such as a cell phone number, a memory dial list, a redial number list, a book mark list, a e-mail address list and a function list that are stored in a cell phone. This print out also illustrates that the user has selected a cash payment at a register of the retail store where the print station is located. The bar code at the lower right indicates the amount of a print fee that needs to be paid at a cash register.

Figure 20:
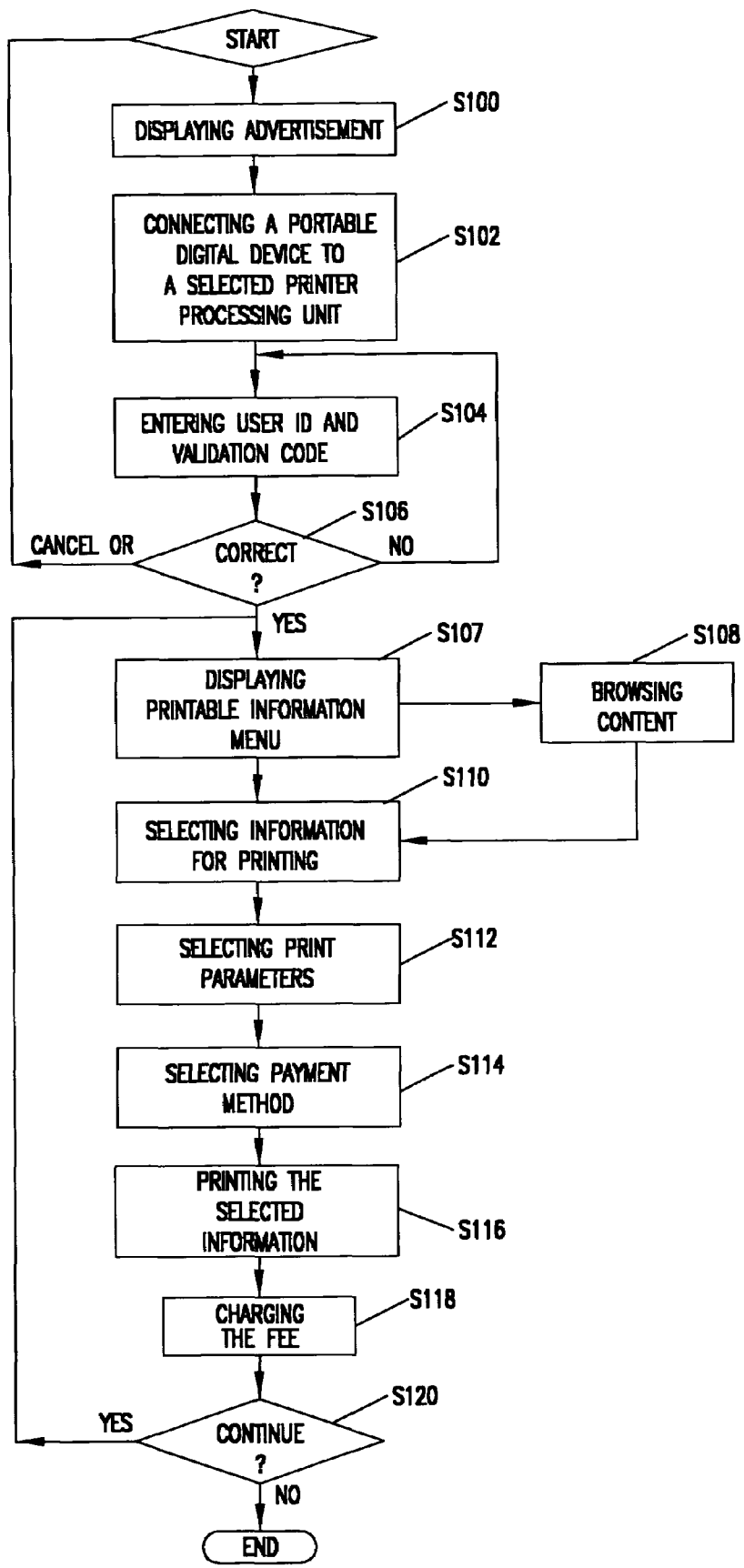
FIG. 20 is a flow chart illustrating acts involved in a preferred over-all process of printing at the printer processing unit according the current invention.

Referring to FIG. 20, a flow chart illustrates acts involved in a preferred over-all process of printing at the printer processing unit according the current invention. Some of the following acts are implemented through the user interface that have been described in the above. In act S100, advertisement is displayed on a screen of the printer processing unit 11 or 31 while it is waiting for a customer to use the printer processing unit. The advertisement space can be sold to any body at a predetermined rate. In act S102, a portable digital device 21 is temporarily connected to the print processing unit 11 or 31. The connection is made either by a cable or wireless means. According to the preferred process, the user has to enter a user ID and a validation code or a password in act S104 after the connection is made in the act S102. The user ID and the matching password are stored at a predetermined location such as the portable digital device 21, the printer station 11 or 31 or a centrally located server. The user inputted ID and password are matched against the predetermined information in act S106. If the match fails, the user is asked to enter the correct information in the act S104 for a predetermined number of trials. When the predetermined number of the trials is exhausted, the preferred process cancels the further acts and returns to the act S100.

Still referring to FIG. 20, the preferred process proceeds when the user inputted ID and the password match the predetermined information in the act S106. In act S107, a list of printable information is displayed to the user. One exemplary list includes categories such as e-mail and web directories, and the list further includes entries of the selected category. According to one preferred process, the user is allowed to browse the content of the selected item for an additional fee in act S108. After confirming the content by browsing, the user selects an item or entry to be printed in act S110. The user optionally selects more than one item to be printed at the same time. After selecting the items, the user now specifies how the selected items are to be printed in act S112. The user inputs print parameters that include a size of a print out, the number of copies and a resolution level. Finally, the preferred process requires the user to specify a payment method from a predetermined set of choices in act S114. The payment choices include a cash payment, a charge/credit card payment, a prepaid card payment and so on. Upon confirming the way to settle the print charge, the preferred process executes the printing in act S116 and subsequently charges the fee based upon the selected payment method in act S118. The user is able to continue the preferred process of the print and charge by going back to the act S107 in response to a prompt in act S120. Otherwise, the preferred process terminates.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of printing information via a portable digital device, comprising:

provideing printer processing units at predetermined locations;

selecting one of the printer processing units for a portable digital device of a user;

establishing a connection between the portable digital device and the selected one of the printer processing units;

selecting printable information stored at an Internet site while viewing the Internet site at a first resolution level;

obtaining the printable information through the portable digital device from the Internet site;

printing the printable information at the selected one of the printer processing units at a second resolution level; and charging a fee for said printing to the user.

2. The method of printing information from a portable digital device according to claim 1 further comprising sending a signal indicative of existence of new printable information to the portable digital device.

3. The method of printing information from a portable digital device according to claim 1 wherein the printable information includes e-mail and web site contents.

4. The method of printing information from a portable digital device according to claim 1 wherein said establishing further comprising:

inputting a user id and a password; and allowing the connection based upon the user id and the password.

5. The method of printing information from a portable digital device according to claim 4 wherein the connection is wireless.

6. The method of printing information from a portable digital device according to claim 4 wherein the connection is via a cable.

7. The method of printing information from a portable digital device according to claim 4 wherein a maximal number of pages to be printed for each use is predetermined for the user.

8. The method of printing information from a portable digital device according to claim 4 wherein a maximal amount of time to print for each use is predetermined for the user.

9. The method of printing information from a portable digital device according to claim 4 wherein a period of time during a day to be printed is predetermined for the user.

10. The method of printing information from a portable digital device according to claim 1 wherein a maximal number of pages to be printed for each use is predetermined for each of the printer processing units.

11. The method of printing information from a portable digital device according to claim 1 wherein a maximal amount of time to be printed for each use is predetermined for each of the printer processing units.

12. The method of printing information from a portable digital device according to claim 1 wherein said printing further comprising selecting a set of print parameters including a number of copies, a print out size, a print material, a print resolution level, and a print speed.

13. The method of printing information from a portable digital device according to claim 1 further comprising selecting a method of payment.

14. The method of printing information from a portable digital device according to claim 13 further comprising:
displaying the fee to the user; and
depositing the fee into the printer processing unit.

15. The method of printing information from a portable digital device according to claim 13 further comprising:
printing a barcode indicative of an amount of the fee; and
paying the fee at a cash resister.

16. The method of printing information from a portable digital device according to claim 13 wherein the fee is charged to a credit card account.

17. The method of printing information from a portable digital device according to claim 13 wherein the fee is charged to a mobile phone account.

18. The method of printing information from a portable digital device according to claim 13 wherein the fee is charged to a prepaid card account.

19. The method of printing information from a portable digital device according to claim 13 wherein the fee is charged to a prepaid card.

20. The method of printing information from a portable digital device according to claim 1 wherein the fee additionally includes a cost for a browsing.

21. The method of printing information from a portable digital device according to claim 1 further comprising a browsing is accomplished by one of a predetermined set of applications programs.

22. The method of printing information from a portable digital device according to claim 1 wherein said printing is accomplished by one of a predetermined set of applications programs.

23. The method of printing information from a portable digital device according to claim 1 wherein said printing prints a predetermined coupon in addition to the printable information.

24. The method of printing information from a portable digital device according to claim 1 wherein the printer processing units are owned by an operator and are located at retail stores that are owned by store owners and further comprising:
accounting a profit amount based upon the fee; and
sharing the profit between the operator and the store owners.

25. The method of printing information from a portable digital device according to claim 24 further comprising:
sending information on the fee to a predetermined data center;
accounting the profit based upon the information at the predetermined data center; and
sending a accounted portion of the profit to the store owners from the predetermined data center.

26. The method of printing information from a portable digital device according to claim 1 wherein said selecting selects a nearest one of the printer processing units based upon a location of the portable digital device with respect to the locations of the printer processing units.

27. The method of printing information from a portable digital device according to claim 1 wherein said printing is finished prior to an arrival of the user to a location where the selected printer processing unit is placed.

28. The method of printing information from a portable digital device according to claim 1 wherein the predetermined locations include airports, train stations and convenient stores.

29. The method of printing information from a portable digital device according to claim 1 further comprising displaying an advertisement to the user.

* * * * *